(12) United States Patent
Martin

(10) Patent No.: US 12,166,848 B2
(45) Date of Patent: Dec. 10, 2024

(54) CONNECTED GATEWAY

(71) Applicant: INTWINE CONNECT, LLC, Chagrin Falls, OH (US)

(72) Inventor: David Martin, Chagrin Falls, OH (US)

(73) Assignee: INTWINE CONNECT, LLC, Chagrin Falls, OH (US)

( * ) Notice: Subject to any disclaimer, the term of this patent is extended or adjusted under 35 U.S.C. 154(b) by 0 days.

(21) Appl. No.: 18/225,181

(22) Filed: Jul. 24, 2023

(65) Prior Publication Data

US 2023/0370534 A1 Nov. 16, 2023

Related U.S. Application Data

(63) Continuation of application No. 16/214,415, filed on Dec. 10, 2018, now Pat. No. 11,711,451.

(51) Int. Cl.
| | |
|---|---|
| *H04W 88/16* | (2009.01) |
| *H04L 49/60* | (2022.01) |
| *H04L 69/08* | (2022.01) |
| *H04L 69/18* | (2022.01) |

(52) U.S. Cl.
CPC ............ *H04L 69/18* (2013.01); *H04L 49/602* (2013.01); *H04L 69/08* (2013.01); *H04W 88/16* (2013.01)

(58) Field of Classification Search
CPC ....... H04L 69/18; H04L 69/08; H04L 49/602; H04L 45/08; H04W 88/16
See application file for complete search history.

(56) References Cited

U.S. PATENT DOCUMENTS

| | | | |
|---|---|---|---|
| 4,146,803 | A | 3/1979 | Kuwabara |
| 5,511,006 | A | 4/1996 | Tachibana et al. |
| 6,288,646 | B1 | 9/2001 | Skardon |
| 6,774,802 | B2 | 8/2004 | Bachinski et al. |
| 7,265,669 | B2 | 9/2007 | Call et al. |
| 7,378,954 | B2 | 5/2008 | Wendt |

(Continued)

FOREIGN PATENT DOCUMENTS

| | | |
|---|---|---|
| EP | 0571367 | 9/1996 |
| WO | 2011090763 | 7/2011 |

OTHER PUBLICATIONS

International Search Report and Written Opinion for International Patent Application No. PCT/US2013/020779 mailed on Mar. 15, 2013, 14 pages.

(Continued)

*Primary Examiner* — Khaled M Kassim
*Assistant Examiner* — Hector Reyes
(74) *Attorney, Agent, or Firm* — Amin, Turocy & Watson, LLP

(57) ABSTRACT

Systems, methods, and computer-readable media are presented herein for providing lower level physical-layer gateway functionalities and upper-level application functionalities; a system designed with flexible configurations in order to support a wide range of connected applications. The system can include a processor that executes machine instructions to perform operations. The operations can comprise: receiving, from a first device, a first packet representing first data formatted in a first protocol language; transforming the first data to second data formatted in a second protocol language; and transmitting a second packet representing the second data to a second device.

20 Claims, 10 Drawing Sheets

(56) References Cited

U.S. PATENT DOCUMENTS

| | | |
|---|---|---|
| 7,417,553 B2 | 8/2008 | Young |
| 8,907,803 B2 | 12/2014 | Martin |
| 9,373,243 B2 | 6/2016 | Martin |
| 9,986,509 B1 | 5/2018 | Diwane et al. |
| 10,291,690 B1* | 5/2019 | Barrueto .................. H04L 69/08 |
| 11,223,682 B2 | 1/2022 | Skaaksrud |
| 11,293,805 B1* | 4/2022 | Riscalla .................. H04L 67/52 |
| 2003/0200337 A1 | 10/2003 | Jabri et al. |
| 2004/0109473 A1 | 6/2004 | Lebizay et al. |
| 2006/0261967 A1 | 11/2006 | Marman et al. |
| 2008/0045156 A1 | 2/2008 | Sakhpara |
| 2008/0263187 A1* | 10/2008 | Casey ..................... H04L 67/56 709/223 |
| 2008/0263189 A1 | 10/2008 | Begorre et al. |
| 2009/0126382 A1 | 5/2009 | Rubino et al. |
| 2009/0247110 A1 | 10/2009 | Sennett et al. |
| 2009/0273470 A1 | 11/2009 | Sinkevicius et al. |
| 2011/0090763 A1 | 7/2011 | Niemeyer et al. |
| 2011/0264276 A1 | 10/2011 | Kressner et al. |
| 2012/0303164 A1 | 11/2012 | Smith et al. |
| 2012/0314585 A1 | 12/2012 | Kamdar et al. |
| 2014/0092742 A1 | 4/2014 | Chou |
| 2015/0194039 A1* | 7/2015 | Martin .................. G08B 25/007 340/632 |
| 2016/0174294 A1 | 6/2016 | Yang et al. |
| 2016/0259932 A1* | 9/2016 | Lakshmanan ....... H04L 61/4511 |
| 2017/0175367 A1 | 6/2017 | Zhu |
| 2019/0007311 A1* | 1/2019 | Omar .................... H04L 45/586 |
| 2020/0098234 A1 | 3/2020 | Skaaksrud |

OTHER PUBLICATIONS

Microchip TC77 "Thermal Sensor with SPI Interface", Microchip Technology Incorporated, 2002, 22 pages.

Figaro "TGS 2602—for the detection of Air Contaminants", Figaro USA, Inc., Jan. 2005, 2 pages.

Honeywell "HIH-4030/31 Series, Humidity Sensors", Honeywell Sensing and Control, Mar. 2008, 8 pages.

Synkera Technologies. Inc. "Low-Level NOx Data Sheet (P/N 706)", Synkera Technologies, Inc., 2 pages.

Dearborn, et al., "Remote Sensing Technology for Indoor Air Quality Monitoring", Case Western Reserve University NCS Study Center Dept. Environmental Health Sciences, 24 pages.

Environmental Health Watch, "Remote Monitoring of Home Air Quality for Comparison of Energy Star and Deep Energy Retrofits", HUD Green & Healthy Homes Technical Studies Program, 2 pages.

Non-Final Office Action for U.S. Appl. No. 16/214,415 mailed Jan. 22, 2020.

Final Office Action for U.S. Appl. No. 16/214,415 mailed Sep. 4, 2020.

Non-Final Office Action for U.S. Appl. No. 16/214,415 mailed Feb. 3, 2021.

Final Office Action for U.S. Appl. No. 16/214,415 mailed Sep. 17, 2021.

Non-Final Office Action for U.S. Appl. No. 16/214,415 mailed Jan. 24, 2022.

Final Office Action for U.S. Appl. No. 16/214,415 mailed Sep. 13, 2022.

\* cited by examiner

CONNECTED GATEWAY

CROSS REFERENCE TO RELATED APPLICATIONS

This application is a Continuation of U.S. patent application Ser. No. 16/214,415, filed Dec. 10, 2018, the contents of which are hereby incorporated by reference.

TECHNICAL FIELD

The subject matter described and disclosed herein relates to networking products that provide lower level physical-layer functionality and upper-level application functionality.

BACKGROUND

Currently network devices, such as gateways or protocol converters that convert transmission packets received in a first transmission protocol into one or more second transmission protocols for subsequent transmission, rebroadcast, or dispatch, have generally not allowed for the definition and/or customization of applications operational and/or executing on the network device. Moreover, the underlying operating systems underpinning operation of many of these network devices have generally been proprietary and thus information as to the functional details of these operating systems has typically been inaccessible and/or unavailable to vendors and/or third parties. Additionally, current network devices are constrained in that they generally are not adaptable and/or amenable to the incorporation of a panoply of new and/or the constantly expanding functionalities and capabilities set forth in continually evolving technical standards promulgated by various networking and telecommunication standards bodies/groups, such as the $3^{rd}$ generation partnership project (3GPP), the institute of electrical and electronics engineers (IEEE), and the like. Furthermore, current gateway devices and/or protocol converters are generally not modular devices and therefore do not allow for the internal installation of customized or customizable third party modules.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
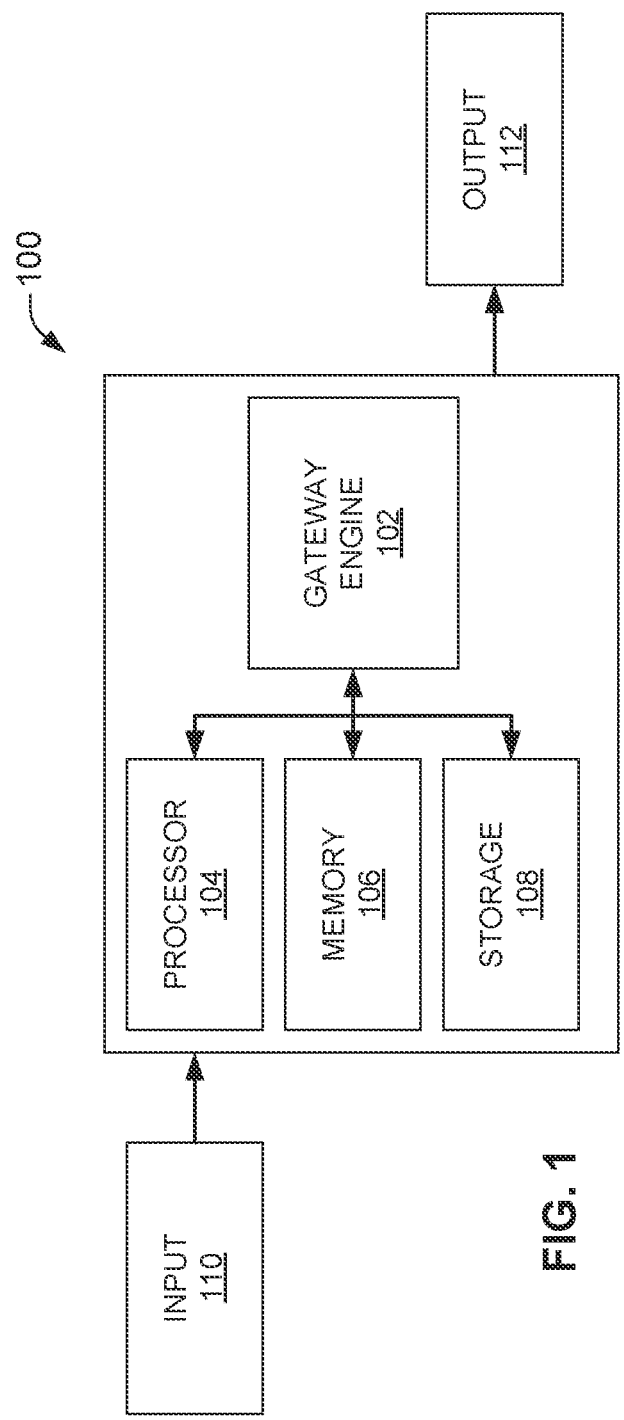
FIG. 1 illustrates a system for providing lower level physical-layer gateway functionalities and upper-level application functionalities in accordance with an aspect of the subject application.

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

The subject application describes and discloses a networking product, for instance a gateway device and/or a protocol converter device, which provides both lower level physical-layer gateway functionality as well as upper-level application functionality. The disclosed and described networking product is designed with flexible configurations in order to support a wide range of connected applications. The networking product provides extensive and reliable local connectivity through its Wi-Fi b/g/n radio with Bluetooth, ZigBee™ HA/SE radio, 10/100/1000 MB Ethernet local area network (LAN) and expansion module slot, which can support Z-wave radios, Sub-GHz radios, and a multitude of additional wired and wireless interfaces. The networking product also provides modularity in its wireless local area network (WLAN) uplink options through its optional 5th generation long term evolution (5G LTE), 4th generation long term evolution (4G LTE) radio, Ethernet WAN and/or configuration in the Wi-Fi client mode. The networking product provides a customized/customizable open-source operating system (e.g., a Linux distribution) with board support and cross compiler tool chain. The build environment of the networking product allows users to add front end business software and develop applications directly on top of the customized/customizable open-source operating system. The described networking product therefore is a software and hardware platform upon which extensive machine to machine (M2M) applications can be executed in order to provide specific end-user functionality.

The described and disclosed networking product provides modularity in its wide area network (WAN) uplink options through cellular 5G LTE, 4G LTE, wired Ethernet, and/or configuration in Wi-Fi client mode. The cellular interface also allows customers the ability to set up both a primary and secondary wireless access network ports. The wireless access network uplink allows users to export data in order to view usage and run applications remotely.

Additionally, the disclosed networking device is designed with flexible configurations in order to support a wide range of connected applications. The networking device provides extensive and reliable local connectivity through its standard Wi-Fi b/g/n radio with Bluetooth and optional ZigBee™ HA, Z-Wave, and Sub-GHz radios. The networking device also has standard Ethernet local access network (LAN), RS-485, or CAN Bus connectivity for wired LAN solutions.

The described networking device allows for the extraction, transformation, and loading of any existing data formats to local and/or remote databases and applications. This capability enables the networking device to support multiple protocols to seamlessly integrate into existing systems.

The described and disclosed networking device provides an open architecture platform with an interpreted high-level programming language for general-purpose programming application-ready framework (e.g., Java, Python, . . . ) that allows for the rapid creation of custom applications. Additionally, the networking device includes a processor and ample internal memory to allow users to run applications directly on the device for local access and intelligence.

In accordance with one or more embodiments and/or aspects of the disclosed subject matter, the networking device provides facilities and functionalities that integrate multiple technologies that can facilitate implementation of a smart office that enables centralized control and/or monitoring of resources (e.g., heating, ventilation, air conditioning, lighting, safety, and/or access control). The networking device thereby provides a scalable office infrastructure that accommodates changing workplace environments and can be adapted and/or granularly individuated for individual user requirements.

In accordance with additional embodiments the disclosed networking device can comprise an interconnected gateway device that can facilitate local computing, function as a smart office onsite controller, and perform functionalities associated with a cellular broadband information technology router. Additionally and/or alternatively, the interconnected gateway device can be adaptably and dynamically configured to be an internet of things (IoT) gateway, wherein various devices, such as consumer and/or industrial appliances, machinery, and/or equipment that can comprise and include at least one processor and that are capable of communication with a wired and/or wireless communications network can be grouped, by the interconnected gateway device, into an adhoc network of communicating devices. The networking device and/or the interconnected gateway device can use open source standards based software in order to facilitate the foregoing functionalities.

Further, the networking device can provide facilities to allow for remote networking via bi-directional communication with the interconnected gateway device (e.g., should the interconnected gateway device be a separate individuated device communicatively couple to the networking device) and a Internet cloud. Bi-directional communication from the networking device, via the interconnected gateway device, to the Internet cloud can be secured using, for example, a secure cellular private network.

Additionally, the networking device can provide a remote management portal that can provide centralized management of resources, such as office space heating, ventilation, and air-conditioning (HVAC), lighting, physical building security, etc. For instance, the networking device can provide facilities to monitor and manage HVAC and smart lighting within a building or other structure. Similarly, the networking device can manage solar and battery storage of electricity and the smooth and seamless integration of generated and stored electricity to the wider electrical grid. As a further example, the networking device can ensure food safety via refrigeration monitoring, whereby the networking device monitors refrigeration units coupled, for example via the gateway aspect, for fluctuations in temperatures that exceed defined optimal threshold values. Further, the networking device can seamlessly supply notification alerts via the interconnected gateway device aspect.

In accordance with further embodiments, the networking device can provide cellular broadband services such as facilitating primary and/or secondary connection services, cellular activation/deactivation services, installation services, data package services, customer service, technical support, remote management, real time usage notifications, billing services, and the like. The disclosed networking device, in order to facilitate provision of the foregoing services, can comprise at least 4G LTE and/or 5G LTE modems and 4G and/or 5G LTE SIM cards. Additionally, the networking device can provide capabilities to provide Wi-Fi and/or Ethernet wide area networking (WAN) and local area networking (LAN)

In accordance with various embodiments, the subject application discloses a machine, device, apparatus, and/or system, comprising: a processor; and a memory that stores executable instructions that, when executed by the processor, facilitate performance of operations. The operations can comprise: receiving, from a first device, a first packet representing first data formatted in a first protocol language; transforming the first data to second data formatted in a second protocol language; and transmitting a second packet representing the second data to a second device.

Additional operations that can be performed can comprise, for instance, facilitating establishing a network connection between the first device and the second device; facilitating authentication between the first device and the second device; detecting a power outage as a function of a fluctuation in a flow of data, between the first device and the second device, traversing through the device; and/or detecting a power outage as a function of a cessation of input power to the device.

Further, the device can comprise a customizable radio module that facilitates wireless communication between the first device and the second device, wherein the customizable radio module implements a modular connectivity standard based on a connectivity protocol, for example: an implementation of a universal smart network access port technical standard; or a protocol independent modular communication interface technical standard. The customizable radio module in accordance with various embodiments can implement a fifth generation long term evolution wireless radio standard; a fourth generation long term evolution wireless radio standard; and/or an IEEE 802.15 technical standard. The customizable radio module, in accordance with one or more embodiments, can be internally coupled with an expansion slot located within the device.

In accordance with still yet further embodiments, the subject application describes a method or process, comprising: in response to receiving, by a system with a processor, first data formatted in a first protocol language from a first device; converting, by the system, the first data to second data formatted in a second protocol language; and sending, by the system, the second data to a second device.

Additionally, the method or process can comprise, for instance: facilitating establishing, by the system, a network connection between the first device and the second device; facilitating an authentication of authentication credentials between the first device and the second device; and in response to determining based on a diminution of a flow of data packets between the first device and the second device, detecting a commencement of a power outage.

In accordance with still further embodiments, the subject application discloses and describes a machine-readable storage medium, comprising executable instructions that, when executed by the processor, facilitate performance of operations. The operations can comprise in response to receiving, from a first device, first packet data formatted in a first communication protocol language, transforming the first packet data to second packet data formatted in a second communication protocol language; and sending the second packet data to a second device. The first communication protocol language can be determined as a function of a first connectivity radio module coupled to the processor. The second communication protocol language can be determined as a function of a second connectivity radio module coupled to the processor.

The following description and the annexed drawings set forth in detail certain illustrative aspects of the disclosed subject matter. These aspects are indicative, however, of but a few of the various ways in which the principles of the subject application can be employed. The disclosed subject matter is intended to include all such aspects and their equivalents. Other advantages and distinctive features of the disclosed subject matter will become apparent from the following detailed description of the various embodiments when considered in conjunction with the drawings.

Turning to the figures, FIG. 1 illustrates a system 100 that provides both lower level physical-layer gateway functionality and upper-level application functionality. System 100 is designed with flexible configurations in order to support a wide range of connected applications. System 100 provides extensive and reliable local connectivity through implementation of wireless technology standards for: exchanging data over short distances, using short-wavelength microwave transmissions in the industrial, scientific, and/or medical (ISM) radio bands [e.g., from 2400-2480 MHz] from fixed and/an mobile devices, creating personal area networks (PANs) with high levels of security (e.g., Wi-Fi b/g/n radio with Bluetooth); a suite of high level communication protocols utilized to create personal area networks built from small, low power digital radios typically based in an IEEE 802.15 standard (e.g., ZigBee™ HA/SE radio), 10/100/1000 MB Ethernet local area network (LAN), and one or more expansion module slots that can support wireless communications protocols designed for home automation to remotely control applications in residential and light commercial environments (e.g., Z-Wave radios, Sub-GHz radios, . . . ), and a multitude of additional wired and wireless interfaces. System 100 and can also provide modularity in its wireless local area network (WLAN) uplink options through its 5G LTE radio, 4G LTE radio, Ethernet wide area network (WAN) and/or configuration in Wi-Fi client mode.

System 100 also provides a customized and/or customizable open-source operating system, such as a Linux operating system distribution, with board support and cross compiler tool chain. The build environment utilized by system 100 allows users to add front-end business software and/or develop applications directly on top of the customized and/or customizable open-source operating system. System 100, in accordance with an embodiment, can therefore be perceived as a software (e.g., software in execution) and/or hardware platform on which extensive machine to machine (M2M) applications can be executed in order to provide specific end-user functionalities.

In accordance with the foregoing therefor, system 100, as depicted, can include gateway engine 102 that can be coupled to processor 104, memory 106, and/or storage 108. As illustrated, gateway engine 102 can be in communication with processor 104 for facilitating operation of computer executable instructions and components by gateway engine 102, memory 106 for storing data and/or the computer executable instructions and components, and storage 108 for providing longer-term storage of data and/or computer executable instructions. Additionally, system 100 can also receive input 110 (e.g., packets received in a first transmission protocol language) for use, manipulation, and/or transformation by gateway engine 102 to produce one or more useful, concrete, and/or tangible result and/or transform one or article to different states or things (e.g., packets that were received in a first transmission protocol language are transformed into packets in a distinguishable second transmission protocol language). Further, system 100 can also generate and output the useful, concrete, and tangible result and/or the transformed one or more articles produced by gateway engine 102 as output 112 (e.g., the packet transformed in the second transmission protocol language).

Gateway engine 102, in accordance with an embodiment, allows users to define the applications that can execute on system 100. Additionally, system 100, and in particular gateway engine 102, employs an open-source operating system, albeit customized. The operating system operational and/or executing on system 100, and thus used by gateway engine 102 to facilitate its purposes, is a non-proprietary operating system. System 100, and gateway engine 102, is more than a Wi-Fi to cellular gateway; it is an expandable/adaptable device that allows expanded functionalities and flexibility, providing functionalities and facilities greater the Ethernet, USB, and Wi-Fi.

System 100 in conjunction with facilities provided by gateway engine 102 provides a modularity to allow installation of customized/customizable modules (e.g., radio modules that can effectuate and/or facilitate a modular connectivity standard that can be based upon the connector type/protocol utilized to connect to system 100 and software in execution or being performed, transacted, executed, and/or enacted by a processor (e.g., processor 104)). Such software in execution can include protocol messaging that can be transacted between a first connecting transmitter device (e.g., cellular device, smart phone, laptop computer, a server computer, desktop computer, personal digital assistant (PDA), mobile devices, handheld devices, portable and/or stationary industrial and/or consumer appliances, industrial automation devices, tablet computers, actuator, controller, and the like), and system 100, and/or a second connecting device (e.g., receiving device) that can utilize system 100 as an intermediary to communicate, via system 100, with the first connecting device. The second connecting device (e.g., receiving device), as will be recognized by those of ordinary skill, can be a smart phone, cellular device, laptop computer, server computers, desktop computers, personal digital assistants (PDAs), mobile devices, handheld devices, portable and/or stationary industrial and/or consumer appliances, industrial automated devices, tablet computers, controller, actuator, etc.

A technology standard that provides the foregoing modularity is one promulgated by the universal smart network access port (USNAP) alliance; the standard enables any home area network (HAN) or demand response (DR) device, present and future, to communicate with utility systems, energy gateways, or other devices within a home or industrial environment, for example. The standard also provides a protocol independent modular communication interface (MCI) that permits device manufacturers to produce intelligent energy aware industrial and/or consumer appliances that are able to interact with each other as well as with, for example, an electrical grid that utilizes information technology to gather and act on information, such as information about the behaviors of suppliers and consumers, in an automated fashion to improve the efficiency, reliability, economics, and sustainability of the production and distribution of electricity (e.g., a smart grid).

System 100 in collaboration with gateway engine 102, as noted earlier provides capabilities to include multiple interchangeable modular radio aspects, such as Ethernet, Wi-Fi, 5G LTE, 4G LTE, ZigBee™, Bluetooth, etc. System 100 can have a customizable expansion radio capability, wherein interchangeable modular radio aspects can be incorporated within the corpus of system 100—through expansion slots. It should be noted, without limitation or loss of generality, that modules are not typically external to system 100, though as will be appreciated by those of ordinary skill, system 100 is not necessarily so limited. In order to facilitate such interchangeable modularity, system 100 can include internal ports for connectivity of additional capabilities/facilities; system 100 does not require additional aspects to be connected via or through external physical ports such as RS-232, Ethernet, LAN, etc.

It should be appreciated that while the subject disclosure is described in terms of technologies and standards maintained by the USNAP Alliance, the subject disclosure is not so limited, as any modular connectivity standard that is based upon the connector type/protocol utilized to connect to system 100 and software in execution that can include protocol messaging transacted between a transmitter/transmitting device, system 100, and/or a receiver/receiving device, wherein the transmitter/transmitting device and the receiver/receiving device utilize system 100 as a communication intermediary device, can be utilized to equal effect and purpose, without departing from the spirit, intent, and/or scope of the foregoing description. Other applicable communication protocols that can be implemented with equal facility and purpose can include use of Bluetooth, ZigBee™, Wi-Fi, for instance. These diverse and/or disparate communication aspects can be implemented through modular components that can be added and/or removed from system 100.

In the context of the suite of high level communication protocols utilized to create personal area networks built from small, low power digital radios typically based in an IEEE 802.15 standard (e.g., ZigBee™), use of this protocol suite provides system 100 the ability to establish a mesh network of devices (e.g., devices similar to system 100). With such a mesh network of devices connectivity is possible where wired connectivity has not been established, such as in portions of buildings where cables have yet to be run and/or may never be run.

In an example application of the foregoing, system 100 can connect to smart meter devices (e.g., ZigBee™ SEP 1.X smart meter devices) that can enable electric utilities and/or end users to manage energy demand over an electric utility's advanced meter infrastructure (AMI) network. System 100, through aspects provided by gateway engine 102, thus has the ability to connect and authentic with a smart meter device using a key establishment procedure. System 100, has the ability to automatically rejoin or re-establish connection, at a network level, to a previously associated smart meter device after a power failure that occurs to system 100. Additionally, system 100 has the capability to rejoin at a network level to a previously associated smart meter device after a general power outage (e.g., after a natural disaster, such as earth quake, hurricane, brownout, etc.). System 100 is also capable of reestablishing connection with the smart meter device should the smart meter device, rather than system 100, be the subject to a power outage. Further, in order to provide interchangeability, system 100 is capable of being reconfigured and/or associated with a disparate smart meter device should the need arise and/or when the smart meter device becomes inoperable. System 100 also provides facilities that allow a smart meter device to decommission/disallow (temporarily and/or permanently) system 100 from being able to access the smart meter device, as circumstances dictate. It should nevertheless be comprehended that reinstatement of access to the smart meter device can be mutually facilitated should system 100 be powered off for a definable duration of time (e.g., 5 minutes, 10 minutes, 30 minutes, 1 hour, 6 hours, 12 hours, 24 hours, etc.) Additionally, system 100 has the facilities to re-associate with the smart meter device when there is a general system wide power failure, and system 100 is but one of many similar devices attempting to re-establish connectivity with the smart meter device.

System 100, using functionalities provided by gateway engine 102, can employ the smart meter device as a time server or time service (e.g., where the smart meter device sets the time) and system 100 can synchronize with the time signal propagated by the smart meter device. In accordance with this aspect, system 100 is also capable of automatically re-synchronizing with the smart meter device should the smart meter device undergo a soft reset; where system 100 itself experiences a connectivity failure (e.g., due to a power outage, having been disallowed connection by the smart meter device, communication failure, etc.); or where the smart meter device and system 100 both are subject to a general power outage and/or a communications failure.

In the context of metering, system 100 can support and/or display summation information recorded by the smart meter device using the formatting information from smart meter device with at least 1 decimal place precision. System 100 also provides support and/or display of current energy demand or energy consumption using formatting information from the smart meter device with at least 1 decimal place precision. Additionally, system 100 provides support and/or display of historical energy consumption, wherein the historical energy consumption uses the formatting information from the smart meter device with at least 1 decimal place of precision. It should be noted that in the context of measuring units, system 100 does not have the usage value for this attribute hardcoded; the measuring units are configurable depending on usage case. System 100 can also support and/or display consumption information according to the smart meter's configuration. Further, system 100 uses the attribute from the smart meter to apply a correct divisor for energy usage as well as use the attribute from the smart meter to apply the correct multiplier for energy usage.

In the context of frequency agility, system 100 is capable of changing to different wireless frequency channels as indicated by the smart meter device and after changing frequency channels is able to resume operation without error. Additionally, system 100 is capable of changing to any channel in a specified spectrum while establishing communication with a smart meter device.

Moreover, system 100, in addition to being able to connect to smart meter devices to deliver demand management services, system 100 can also connect to a grid of similar devices and utility demand management internet protocol based servers via a broadband network through technical standards and protocols promulgated by the Open Automated Demand Response (OpenADR) alliance. System 100 therefore in able to simultaneously connect to electric utilities both through the smart meter device as well as through the Internet (e.g., using protocols provided by the Open Automated Demand (OpenADR) alliance). This facility provides utilities (e.g., electric, water, gas, etc.), homeowners, and residential and/or commercial building owners unmatched flexibility in network architecture.

Typically, system 100 can comprise or be associated with an uninterrupted power supply, as such when system 100 is situated between a router (e.g., home router) aspect and a wider local area network (LAN), system 100 can sense power outages and can configure and/or reconfigure itself to perform the additional facilities and/or functionalities generally provided by the router aspect. The configuration or reconfiguration of system 100 to perform the additional functionalities and facilities of the router aspect can be based on, or performed as a function of, a detection of a rapid diminution/cessation of a flow of data traversing through system 100 and/or a detection of a cessation or a fluctuation of input power to system 100 itself. It should be noted in this regard that various set points and/or thresholds (absolute and/or variable) can be employed in determining whether or not a flow of data has diminished with sufficient rapidity and/or whether or not power to system 100 has fluctuated sufficiently to warrant configuration of system to undertake the added responsibilities and functionalities of the router aspect.

On initial setup and/or configuration, system 100 can, for example, download, from a cloud storage service, a customized and/or a customizable operating system. As has been noted above, the customized and/or customizable operating system can be a distribution of an open source operating system, such as a customized distribution of Linux. The download from the cloud from the cloud storage service can be performed on a push and/or a pull basis, wherein on a push basis, a cloud storage service detects that system 100 has connected, via a local area network, to the cloud in general and that an appropriate distribution should automatically be forwarded to system 100. Conversely, where the customized and/or customizable operating system is to be disseminated from the cloud storage service to system 100 on a pull basis, system 100 can request that the customized and/or customizable operating system be downloaded from the cloud storage service. In this manner, regardless of whether the open source operating system is downloaded from the cloud storage service on a push basis and/or retrieved from the cloud storage service a pull basis, system 100 can download an operating system that can be automatically and uniquely configured and/or adapted as a function of one or more modules that can have been included within system 100 at the point in time when system 100 connects to the cloud via a local area network. It should be noted in regard to downloading of the customized and/or customizable operating system that the operating system distribution can be downloaded to system 100 in response to a user prompt (e.g., where a user utilizes a dialog with a cloud storage service to download an appropriate operating system distribution).

In the context of the foregoing operating system, it should be noted that system 100 can be booted from a secure digital (SD) memory card. This feature enables system 100 to be shipped to other equipment manufacturers in an "un-configured" state and provides the other equipment manufacturers the ability to configure and/or customize system 100 to their own specifications, thereby allowing these manufacturers the ability to effectively protect their proprietary intellectual property.

In accordance with an embodiment, system 100 can be utilized in a network of air quality monitor devices, wherein the air quality monitor devices include a multitude of air quality sensors (e.g., particulate matter sensors, temperature sensors, relative humidity sensors, volatile organic compound sensors, nitrogen oxides sensors, carbon monoxide sensors, combustible/flammable gases sensors, carbon dioxide sensors, formaldehyde sensors, hydrogen sensors, oxygen and/or ozone sensors, ammonia sensors, chlorine sensors, hydrogen sulfide sensors, and the like), measuring devices (e.g., light meters, barometers, radon monitors, thermostats, and the like), controllers (e.g., based on, or as a function of, measurements received from one or more sensors and/or measuring devices, one or more absolute threshold or set point and/or one or more defined or dynamically determined variable threshold or set point with respect to the measurements, causing or initiating actuation of abatement devices such as: ventilators, air conditioners, humidifiers, extraction fans, heaters, coolers, chillers, blowers, and the like), and actuators (e.g., for actuating the abatement or mitigation devices to open and/or close windows and doors, extract air from enclosed spaces, . . . ).

Each of the networked air quality monitor devices can also include facilities to disseminate notifications via email, telephonically, using a short message service (SMS), a multi message service (MMS), a paging service, or the like, to notify appropriate persons of the deterioration of the air quality within (or external to) a enclosed area (e.g., a residential home, a clean room, etc.). Additionally and/or alternatively, the facilities and/or functionalities to disseminate, send, or dispatch notifications by email, telephonically, using short message services, multi message services, paging services, to notify relevant parties of the deterioration of the air quality within confined areas can also be performed by system 100, and in particular by gateway engine 102.

Further, air quality monitor devices can also include facilities to cause the activation of one or more audio/visual warning indicators that can be associated with the networked air quality monitor devices or the one or more audio/visual warning indicators can be activated by system 100 (e.g., gateway engine 102 acting as a analytical and/or communication coordination nexus). Typical audio/visual warning indicators that can be activated by the air quality monitor devices on their own volition (or at the behest of system 100 and in particular by gateway engine 102) can include alarms, such as horns, buzzers, etc. and flashing light emitting diodes (LEDs). These audio/visual warning indicators and/or dispatched notifications provide a method of informing relevant parties within, or external to, a confined space or area that the air quality has deteriorated or is deteriorating to deleterious levels because of rising levels in one or more measured air pollutant and/or humidity and/or temperature within the confined space, and that action needs to be taken to either abate the hazard (e.g., by ventilating the confined space) or by moving to a safer zone (such as moving outdoors, or to a pre-established clean room where the air quality is less hazardous or is subject to more robust air quality abatement or mitigation measures).

As intimated above, the aforementioned air quality monitor devices can be networked with one another and/or can be communicatively coupled to system 100. The connecting communications technologies that can be utilized by the air quality monitor devices and/or system 100 to establish network communications between each other to form the network or grid can include utilization of: advanced metering infrastructure (AMI) technologies, Wi-Fi technologies, cellular broadcast standards (e.g., 3GPP and/or 4G LTE standards, IEEE protocols, etc.), FM radio, the Internet, paging services, power line carrier technologies, etc. Other technologies that can be utilized with equal facility and/or functionality to establish communication networks between the respective air quality monitor devices and/or system 100 can include, for instance, a suite of high level communication protocols utilized to create personal area networks built from small, low power digital radios (e.g., ZigBee™); wireless standards for exchanging data using short wave length microwave transmissions in the industrial, scientific, and medical (ISM) radio bands (e.g., from 2400-2480 MHz) from fixed and/or mobile devices, creating personal area networks with high levels of security (e.g., Bluetooth); and/or technologies that utilize message based protocols designed to be employed in vehicles such as: automobiles, buses, trains, industrial and/or agricultural vehicles, waterborne vessels, aircraft, etc. to allow microcontrollers and/or devices to communicate with each other within the vehicle without the necessity of a host computer (e.g., CAN Bus).

As has been noted above, system 100, and the functionality and/or facility provided or supplied by gateway engine 102, in accordance with an embodiment, is as a device that converts packets received in a first transmission protocol language to packets formatted in a second transmission protocol language. The transformation that therefore takes place, is that a first packet received from a first device formatted in a first transmission protocol is transformed and/or formatted into a second packet in a second transmission protocol that can be transmitted to a second device. A useful concrete and tangible result or a transformation of an article to a different state or thing is thus resultant; from a packet configured for transmission by a first device in a first transmission protocol and comprehensible to the first device to a packet configured for reception by a second device in a second transmission protocol, wherein the packet received in the second transmission protocol is comprehensible to the second device.

Additionally system 100, in collaboration with gateway engine 102, can also convert raw sensor data (e.g., data obtained and/or solicited from one or more sensor devices and/or one or more measurement devices included or associated with one or more air quality monitor device organized as a network of air quality monitor devices and/or a set of networked air quality monitor devices, wherein a set as utilized throughout this disclosure is a grouping of devices that includes at least one device and the grouping is not a null or empty set) to physical units. Accordingly, system 100 and gateway engine 102 in particular can obtain and/or retrieve (e.g., from a server aspect situated in a network cloud), store (in memory 106 and/or in storage 108), and utilize calibration equations, graphs, tables, or charts, or other calibration mappings to convert raw sensor data to a physical measurement. It should be noted at this junction that the sensors and measuring instrumentation utilized and/or included within the air quality monitor devices at issue typically generate signals (analog and/or digital) that require one or more calibration equations, tables, graphs, charts, or other mapping or conversion techniques to convert a raw signal received from an air quality monitor device to an intelligible or comprehensible physical measurement that can be utilized to determine, in conjunction with various absolute and/or predetermined, contemporaneously ascertained and/or defined set point or thresholds, whether the air quality within a contained area or space has or is deteriorating.

The physical measurements generated by system 100 through facilities provided, for instance, by gateway engine 102 and/or its associated components can thereafter be displayed, for instance in an application operating and/or operational on system 100; an application that can graph the physical measurements on an associated display device (e.g., monitor display device within a web browser, etc.). The display of physical measurements within an application operating and/or operational on system 100 and/or in a graphical application executing on system 100, such as a web browser, can be effectuated locally and/or remotely. The graphical display generated by system 100 and projected onto a display surface can display thresholds or set points. For example, if air quality readings exceed and/or fall below defined and/or predetermined thresholds or set points, system 100 (and gateway engine 102) can send alerts, alarms (audible and/or visible), notifications (e.g., via e-mail, text message, paging, etc.), activate extraction fans, actuate the opening/closing the windows/doors, actuate air conditioners, blowers, heaters, coolers etc. in order to mitigate the deterioration of the air quality.

It will be noted, without departing from the generality of this disclosure, that the foregoing is managed from a single device, e.g., system 100, and more particularly gateway engine 102. Nevertheless, the foregoing facilities and functionalities can also be managed remotely from another device accessing system 100. Accordingly, system 100, through use of gateway engine 102, has the ability to virtualize the physical measurements pertaining, in this instance, to air quality measurement data obtained from one or more air quality monitor devices, and thereby provide a remote monitoring capability that allows remote monitoring devices, based on and/or as a function of the physical measurements representative of the air quality measurement data (e.g., the raw data captured by sensors or measuring instrumentation associated with a network of air quality monitor devices that was directed to system 100 for transformation to physical measurement data), one or more defined, predetermined, dynamically determined (e.g., contemporaneously determined through use of one or more artificial intelligence and/or machine learning techniques and/or technologies that can be included within an artificial intelligence component, such as neural networks, expert systems, Bayesian belief networks, support vector machines (SVMs), Hidden Markov Models (HMMs), fuzzy logic, data fusion, collaborative filtering, and the like) thresholds or set points, absolute and/or variable, to dispatch alerts/notifications, activate alarms, actuate or set in motion a chain of events that culminates in the abatement and/or mitigation of the deterioration in error quality. Such abatement and/or mitigation activities can include actuating extraction fans, ventilators, humidifiers, dehumidifiers, sump pumps, atomizers, heaters, coolers, air conditioners, blowers, air pumps, air enrichment units, etc.

System 100 in collaboration with gateway engine 102 can also include a smart sampling aspect, wherein data from one or more sensors and/or measuring devices is read as a continuous stream of data and thereafter is subject to a sampling technique that reduces the bandwidth necessary to transmit or convey the data to cloud storage and/or for analysis by an analytic engine associated with one or more research and/or medical institution.

System 100, once again though use of facilities and functionalities provided by gateway engine 102, can employ an intelligent sampling process or algorithm that is applied to captured/collected raw or real data (e.g., data collected by deployed sensor devices situated in the field, such as air quality monitor devices, home energy management devices, devices employed by security facilities such as jails and/or secure facilities such as data centers, financial institutions, and the like) in order to reduce the amount of data that needs to be communicated over wired and/or wireless networks.

The process or algorithm operational on gateway engine 102 operates in two sampling modes: (1) a quiescent mode (typically the default mode); and (2) a high-sample mode. In the quiescent mode, for example, raw data is stored to storage 108 at a low sampling rate (e.g. every five minutes). In the high-sampling mode, for instance, raw data is persisted to storage 108 at a highly sampling rate (e.g., every thirty seconds).

When rapid deviations or variances from a steady-state in one or more aspects in the collected raw data (e.g., changes in a sensor reading associated with humidity, temperature, airborne contaminants—particulate matter, volatile organic compounds, formaldehyde, nitrogen oxides, carbon monoxide, combustible gases, carbon dioxide, radon, hydrogen, hydrogen sulfide, chlorine, mold spores, ozone, ammonia, etc.) is detected, or where the deviation is of a magnitude that surpasses an absolute threshold and/or a threshold that is configurable by a user and/or is contemporaneously and dynamically determined using one or more artificial intelligence or machine learning techniques, such as neural networks, collaborative filtering, etc., the sampling mode can dynamically and/or automatically be changed from the quiescent mode to the high-sample mode. Conversely, where abatement, for example, in the airborne contaminant scenario, is successful, the sampling mode can return/revert to the quiescent state from the high-sample mode.

More particularly, the process as carried out by system 100 and/or gateway engine 102, determines a continuous moving average, wherein a user-defined parameter can be employed to determine the size of the sampling window over which the average is determined, as well as the overlap between subsequent average determinations. When sensor readings are received, the sensor readings can be converted to physical units. Where the physical units fall outside a specified percentage above or below (1% above or below) the average, sensor readings are taken at an increased sampling rate for a defined or definable amount of time before the threshold test begins again. When the physical units are less than or equal to an upper limit (e.g. 1% above the average) or greater than or equal to a lower limit (e.g., 1% below the average), the sampling rate is in quiescent mode and sensor readings are taken at a reduced periodicity (e.g. every 5 min. though periodicity can be adjusted based on or according to specific requirements and/or application). As long as subsequent sensor readings remain within the boundaries set forth by the upper and/or lower limits, the periodicity of sampling remains in the quiescent mode and the subsequent sensor readings may not be recorded and/or may not be persisted to storage 108, for example.

If more than a defined period of time elapses between measurements, the sampling window can be repopulated and the process is reset. It should be appreciated that during population and repopulation, sensor readings are performed at the high sample-rate (e.g., every 30 seconds).

For clarity of exposition of the foregoing process employed by gateway engine 102, there are seven parameters: (1) window size—the number of samples used to determine the average; (2) lag—the number of samples to wait before a new average is determined, as new samples are populating the window; (3) upload limit variance—defines an upper limit threshold value, specified as a function of (e.g., percentage) the most recent average determination; (4) lower limit variance—defines a lower limit threshold value, specified as a function of (e.g., percentage) the most recent average determination; (5) time-limit—if the amount of time that has elapsed since the last measurement is longer than the time-limit variable, the window is repopulated causing the process to start over; (6) average variance—during periods when signals are within the band defined by the upper limit variance and the lower limit variance, the average variance defines how much deviation is allowed from the initial average value that was sent before a new average value is sent; and (7) sample high time—after a threshold test has been violated, sensor measurements are sent out every 30 seconds for the time specified by this the sample high time variable.

In accordance with an embodiment, system 100 in conjunction with gateway engine 102 can be configured to be connected to the Internet through a wide area network (WAN) via wired Ethernet, such that should the wired wide area network connection fail or be severed for any reason, system 100 using facilities provided by gateway engine 102 can seamlessly "fail over" and switch connectivity to the Internet using a wireless or cellular network connectivity to ensure uninterrupted functionality to an end user, for example. Once wired wide area network connectivity is restored, system 100, once again through functionality provided by gateway engine 102, can "fall back" to being connected to the Ethernet via the wired wide area network connection. This feature enables end users to leverage the low cost of wired wide area networks while using wireless or cellular connectivity as a fail over as an assurance of connectivity.

In addition, system 100 in accordance with an embodiment can also include an onboard web server or web service wherein system 100 can be accessible and fully operational to any local browser and/or wireless/cellular device (e.g., smart phone device, handheld device, etc.) without the necessity of system 100 being connected via a wired wide area network.

System 100 in addition to the foregoing can also include a protocol stack that enables remote connectivity to a cloud service/server that provides remote network management facilities and/or functionalities, such as over the air software maintenance and/or upgrade capabilities, and the ability to download new applications over the air (e.g., wirelessly). In the context of the latter facility, if a homeowner purchases system 100 for the purposes of an "indoor air quality monitoring" application, the homeowner can subsequently go online and purchase a further application, such as a "home energy management" application that can be employed to dynamically switch between one or more energy suppliers (e.g., grid power supplier, solar energy power supplier, wind energy power supplier, etc.) as a function of a unit cost to the home owner of consuming power. The purchase of the further subsequent application can initiate a chain of events that can culminate in the download and execution of the application on system 100 with no further user intervention. In accordance with an aspect therefore, the foregoing protocol stack can also be employed by system 100, and gateway engine 102, to manage cellular connectivity usage to fit into most cost effective cellular rate packages, as well as to provide notification should any device connected to system 100 and/or should system 100 itself go offline for any reason.

System 100 in addition to being powered through mains power (AC/DC power) can additionally and/or alternatively be operational using power over Ethernet (POE). As will be appreciated by those of ordinary skill, operating via power over Ethernet eliminates the need for a mains power outlet being located near system 100.

In addition to the foregoing, system 100 can include an uninterrupted data supply (UDS) functionality that can be analogous to an uninterruptible power supply (UPS) feature. Typically, the uninterrupted data supply feature can broadcast to a Wi-Fi network to which system 100 has/had established connection through a primary router in cases of power outages and/or when there are sensed primary router failures. Further, the included uninterrupted data supply aspect can also be configured to provide high-priority devices operating crucial applications (e.g., email servers, application servers, etc.) the required bandwidth for continued operations, while concurrently blocking or limit lowering non-crucial low priority applications (e.g., Netflix, Youtube, and the like) from continued/continuous operation. The uninterrupted data supply features of system 100 can also be configured or programmed to shut off or terminate when data limits have been reached in order to avoid data plan overages. Moreover, as will be appreciated by those of ordinary skill, the uninterrupted data supply facilities associated with system 100 can typically be tied to ancillary power sources, such a battery power packs, these ancillary power sources can also be beneficially utilized to provide power to other associated devices crucial and/or necessary to maintain continued network connectivity during power outages.

Additionally, system 100 in accordance with an embodiment and in collaboration with gateway engine 102 can provide a business continuity aspect that provides functionalities and facilities for Internet failover. In accordance with this aspect, system 100, and in particular, gateway engine 102, in response to detecting an Internet outage, for example, as a function of a diminution or cessation of data packet traffic traversing through facilities provided by system 100, or as a function of a cessation or a fluctuation of input power to system 100 itself, can cause system 100 to undertake the added responsibilities and functionalities of performing as a router. In this manner, system 100 acting conjunction with gateway engine 102 can provide always on Internet access.

Further, system 100 and gateway engine 102 in the context of the business continuity aspect, can provide a monitoring functionality as well as a energy management functionality. The monitoring functionality can, for instance, be triggered by gateway engine 102 based at least in part on gateway engine 102 initiating facilities associated with failover functionalities in response to detecting or determining that there has been a detectable diminution data packet traffic traversing through facilities provided by system 100, or in response to identifying a fluctuation of input power to system 100 (or components or devices/sensors with which system 100 is in wired and/or wireless communication). Similarly, the energy management functionality can also be triggered by gateway engine 102 as a consequence of gateway engine 102 initiating facilities associated with failover functionalities as a function of identifying that there has been a cessation of data traffic traversing through system 100, or in response to identifying cessation of input power to system 100.

In the context of the monitoring functionality associated with gateway engine 102, gateway engine 102 can provide monitoring functionalities and facilities associated with occupancy, temperature/humidity, moisture, and power monitoring. In particular, gateway engine 102 can provide monitoring functionalities and facilities to determine occupancy within a defined habitable space within a habitable structure, unauthorized access and/or activity within the defined habitable space (or within the habitable structure), wherein gateway engine 102 can analyze changes, over defined or definable durations time, associated with, for instance, infrared sensors that generate heat mapping data, and/or pressure pad sensors that can generate pressure mapping data. Other sensor devices can also be utilized with equal facility and/or functionality to detect occupancy can include photo-electric eye sensor devices, tactile pressure sensor devices, proximity sensors, and the like. In the context of the infrared sensors these sensors, for example, can strategically be positioned throughout the habitable space being monitored. With respect to the pressure pad sensors, these sensors can be installed over the floor of the habitable space being monitored and can detect or determine deflections or distortions in the floor structure caused by pressure being exerted directly on a pressure pad sensor or where pressure is exerted in close proximity to at least one or more pressure pad sensors positioned within the habitable space being monitored.

Additionally in the context of the monitoring functionality, gateway engine 102 can also monitor climate-sensitive goods and areas within the habitable structure in real time and can generate and dispatch trend-based alerts/notifications. In accordance with this aspect, gateway engine 102 can utilize temperature and/or humidity sensors situated or located throughout the habitable structure (or located in identified or identifiable areas within the habitable structure, such as, walk-in refrigerators, wine cellars, clean rooms, and the like) to identify areas within the habitable structure (or identified/defined portions thereof) and detect or determine whether temperatures and/or humidity within these areas exceed or fall below defined or definable set points and/or threshold values. Should gateway engine 102 determine that the detected humidity and/or temperatures have exceeded determined or determinable thresholds, or fall below determined or determinable set points, gateway engine 102 can initiate abatement processes that can include generating and sending notification messages to human intermediaries, causing activation of abatement devices and/or mitigation devices such as chillers, heaters, air-conditioners, extractions fans, etc.

Further, gateway engine 102 in relation to the described monitoring functionality, in real-time and in conjunction with one or more liquid/fluid detection sensors (e.g., sensors that can detect the escape or release of liquids as well as detect the release or escape of gases) and/or humidity sensors dispersed throughout the habitable structure, can measure the ambient atmosphere within habitable structures in general, and/or selected areas within the habitable structures, for the unexpected or unforeseen escape of liquids and/or gases. In accordance with this aspect, gateway engine 102 in collaboration with one or more liquid/fluid detection sensors and/or humidity sensors can detect and identify the location of an escape of liquids and/or gases based at least in part on changes in data representative of a measured relative humidity detected by one or more humidity sensors and/or changes in sensor data associated with the one or more liquid/fluid detection sensors. Gateway engine 102, in response to detected changes in data representative of measured relative humidity and/or changes in sensor data associated with the one or more liquid/fluid detection sensors, can generate and transmit notification messages to one or more devices used by human intermediaries so that the notified human intermediaries can initiate appropriate mitigation and/or abatement measures. Additionally, gateway engine 102, in response to detected changes in data representative of measured relative humidity and/or changes in sensor data associated with the one or more liquid/fluid detection sensors (e.g., exceeding defined or definable set points or falling below defined or definable thresholds), and through use of allied artificial intelligence functionalities/facilities and/or associated neural network devices/components, and based on disparate data received from a multiplicity of disparate other sensor devices can facilitate initiation one or more abatement devices and/or mitigation strategy, such as causing an actuator to turn off a valve associated with the flow of the escape of liquid or gas, or cause the actuator to reduce the flow of liquid/gas passing, through flow meters communicatively (wired and/or wirelessly) coupled or operably coupled to the valve, into the habitable structure or defined areas within the habitable structure.

Furthermore, in the context of the described and disclosed monitoring facilities/functionalities set forth herein, gateway engine 102 can provide a power monitoring facility/functionality, wherein power consumption by system 100 and/or disparate and varied devices and sensors situated within the entirety of the habitable structure (or selected, identified, or identifiable devices and/or sensors powered by identified, determined, selected, or defined power circuits extant within the habitable structure) can be monitored. The power monitoring facility/functionality can be used to establish and/or gain insight into usage patterns, wherein data representative of usage pattern data can be used to reduce power consumption within the habitable structure as a whole, and thereafter affiliated artificial intelligence components and/or neural network devices using the usage pattern data can be employed to maintain a consistency of minimal power usage by the disparate and varied devices and sensors located within the habitable structure (or portions thereof). The power monitoring facility/functionality can also be used to set up alerts/notifications to be sent to human intermediaries, the alerts/notifications can provide indication of unusual power spikes and/or power usage patterns that do not comport with an established pattern of power usage.

With regard to the energy management functionality provided by gateway engine 102, gateway engine 102 in conjunction with determinations made by an occupancy detection aspect and based on, or as a function of, changes, over defined or definable periods of time, associated with heat mapping data and/or pressure mapping data can provide day-lighting and/or light-level tuning functionalities wherein the lighting within a habitable structure can be dynamically adjusted throughout the day to effectuate power savings in the context of lighting the habitable structure (or portions of the habitable structure). Gateway engine 102 in the context of the energy management functionality can also provide, through actuators and/or wireless wall control devices (with or without manual override capabilities), seamless control of lighting within the habitable structure (or portions of the habitable structure).

Gateway engine 102, in accordance with additional functionalities of the energy management aspect can also provide functionalities and facilities associated with wireless Wi-Fi or ZigBee™ thermostats, wherein gateway engine 102 in response to determined fluctuations in temperatures beyond or below defined or definable thresholds can automatically and dynamically adjust the ambient temperature within habitable structures in their entirety, or within selected portions of the habitable structures, for example, by utilizing analysis of heat map data to determine which areas within the habitable structures are currently occupied and data received from the thermostats situated within the occupied areas. In a similar manner, gateway engine 102 can also provide facilities and/or functionalities associated with wireless lighting/electric controls to actuate smart bulbs and smart electrical fixtures. In accordance with this aspect, gateway engine 102, through use and analysis of data received, for instance, from one or more sensors associated with determining occupancy (e.g., proximity sensors, pressure sensors, infrared cameras/sensors, motion sensors, tactile pressure sensors, photoelectric eye sensors, devices that scatter laser light in intersecting patterns, moisture/humidity sensors, and the like), and/or determining temperatures and/or humidity within habitable structures, can wirelessly activate and/or deactivate smart bulbs and smart electrical fixtures as a function of data received or generated while monitoring a particular habitable structure (or portions of the particular habitable structure).

In an additional aspect, gateway engine 102, in conjunction with data received and analyzed in the context of monitoring activities performed by gateway 102, can utilize relays and dimmers (e.g., that conform to: 0-10 volt (V) electronic lighting control signaling systems; and/or network-based systems that control lighting in building automation, such as Digital Addressable Lighting Interface (DALI™)) to control lighting. Similarly, gateway engine 102 using data gathered and analyzed during monitoring habitable structures for occupancy, temperature and/or humidity deviations, the escape of fluids and/or liquids, and fluctuations in power usage/consumption, can use ZibBee™ and/or Wi-Fi smart plugs to both monitor and control plug loads.

Figure 2:
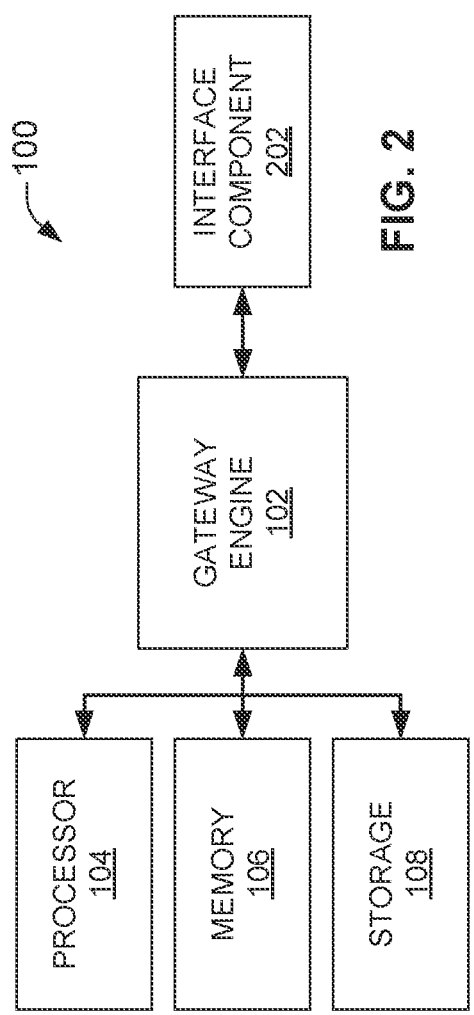
FIG. 2 provides a more detailed depiction of a system for providing lower level physical-layer gateway functionalities and upper-level application functionalities in accordance with an aspect of the subject application.

FIG. 2 provides further illustration of system 100, wherein in addition to gateway engine 102, processor 104, memory 106, and storage 108, system 100 can also include interface component 202. Interface component 202 can be operational in collaboration with gateway engine 102 and can provide interface support (hardware and/or software) for various radio and networking interfaces, such as: interface support for technologies that allow electronic devices to exchange data or connect to the Internet wirelessly using radio waves, and that can be based on IEEE 802.11 standards (e.g., Wi-Fi, wireless access network (WAN), wireless local area network (WLAN), . . . ); and interfaces that enable system 100 to communicate, both wired and/or wirelessly, using the Ethernet; interfaces that permit system 100 to beneficially utilize the wireless and/or wired capabilities developed and promulgated by technical standards organizations, such as the $3^{rd}$ generation partnership project (3GPP). Interface component 202 can also provide interconnection and/or support for interfaces such as USB, ZigBee™ (HA or SE), Bluetooth, CAN Bus, and the like.

Figure 3:
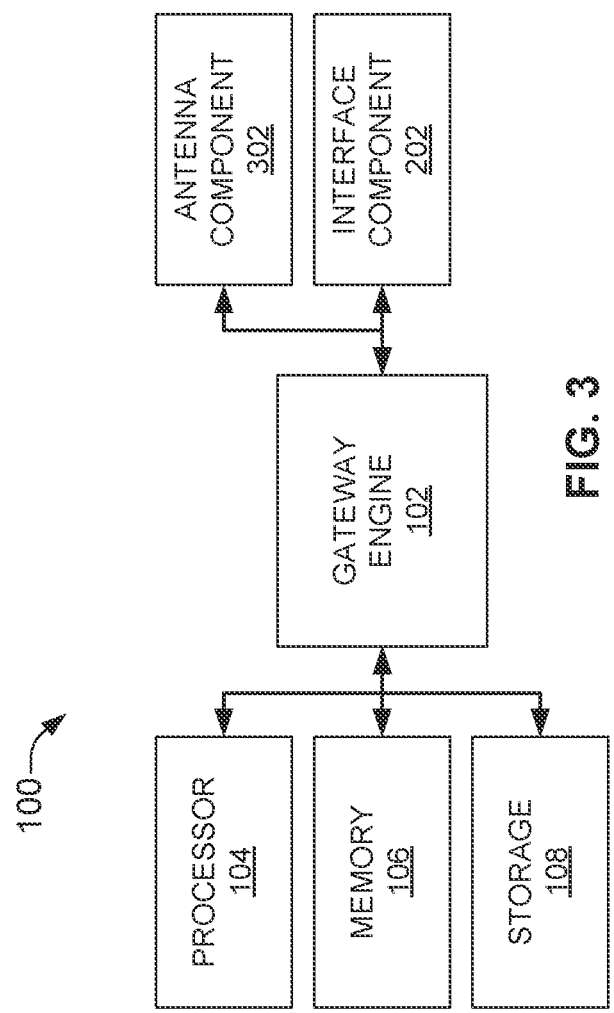
FIG. 3 provides a further illustration of a system for providing lower level physical-layer gateway functionalities and upper-level application functionalities in accordance with an aspect of the subject application.

FIG. 3 depicts further aspects of system 100, wherein in addition to gateway engine 102, processor 104, memory 106, storage 108, and interface component 202, system 100 can further include expansion component 302. Expansion component 302 provides support for non-standard wired and/or wireless interfaces. Expansion component 302 utilizes a form factor that supports a modular connectivity standard based on connector type and/or connector protocol. In accordance with an embodiment, expansion component 302 can utilize a form factor based on standards set forth by the universal smart network access port (USNAP) alliance. Expansion component 302 allows customized or customizable daughter cards to be created that can meet the communication needs of any network of end devices, such as air quality monitor devices, home/industrial energy management devices (e.g., devices, such as thermostats, water pump controllers, renewable resource energy generation [solar, wind, etc.] and storage facilities, etc. that when connected to system 100 permit utility resource management to be conducted from the central analytical nexus that is system 100), amongst others.

Figure 4:
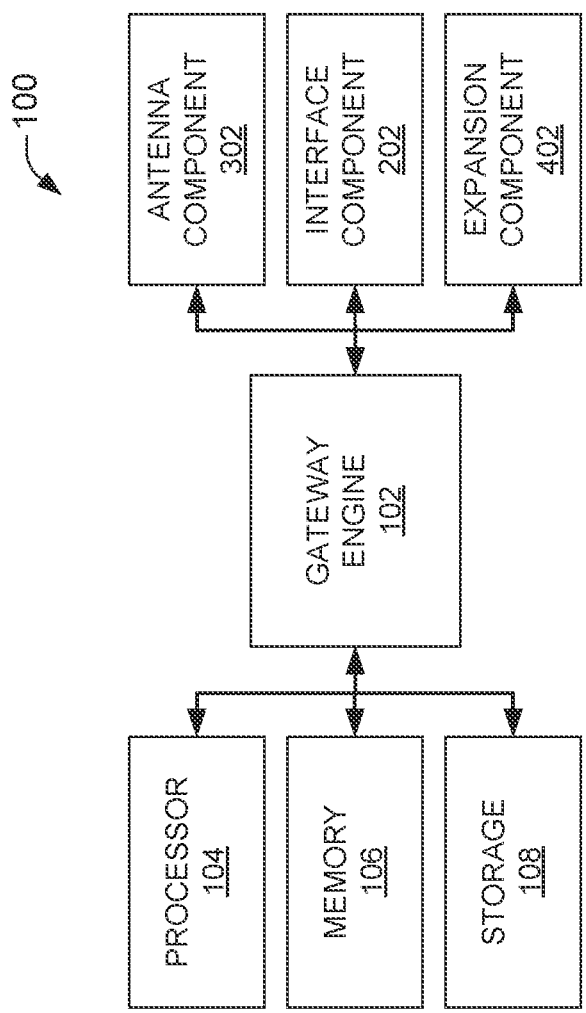
FIG. 4 provides another depiction of a system for providing lower level physical-layer gateway functionalities and upper-level application functionalities in accordance with an aspect of the subject application.

FIG. 4 illustrates further aspects of system 100, wherein system 100 can also include antenna component 402, in addition to gateway engine 102, processor 104, memory 106, storage unit 108, interface component 202, and expansion component 302. Antenna component 402 can be employed by system 100 to receive and/or transmit signals and data as necessary. Antenna component 402 can therefore include a receiver device that can receive signals from one or more disparate device (e.g., air quality monitor devices) through a plurality of receive antennas provided by a receive antenna array. The receiver device can receive information from the receive antenna and is operatively associated with a demodulator device that demodulates the received information. Demodulated symbols can be analyzed by a processor 104 that can be a processor dedicated to analyzing information received by the receiver device and/or generating information for transmission by a transmitter device, a processor that controls one or more components of systems 100, and/or a processor that both analyzes information received by the system 100, generates information for transmission by the transmitter device, and/or controls one or more components of systems 100, and which is coupled to memory 106 that stores data to be transmitted to or received from the one or more disparate devices, and/or any other suitable information related to performing the various actions and functions set forth herein.

Antenna component 402 can also include a transmitter device that transmits data to the one or disparate devices through a transmit antenna array. Typically, the transmitter device is coupled to a modulator device that can multiplex frames for transmission by the transmitter device via the transmit antenna array to the one or more disparate devices.

In the foregoing description, numerous specific details have been set forth to provide a thorough understanding of the embodiments. One skilled in the relevant art will have recognized, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to select appropriate relay stations for secondary transmitter and secondary receivers randomly situated within a cognitive radio network, wherein the secondary receiver and secondary transmitter can base their respective decisions as to which relay station is the most suitable relay station at least in part on links between the relay station and the secondary receiver and the secondary transmitter and the relay station.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

FIGS. 5-9 illustrate methodologies in accordance with the disclosed subject matter. For simplicity of explanation, the methodologies are depicted and described as a series of acts. It is to be understood and appreciated that the subject application is not limited by the acts illustrated and/or by the order of acts. For example, acts can occur in various orders and/or concurrently, and with other acts not presented or described herein. Furthermore, not all illustrated acts may be required to implement the methodology in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
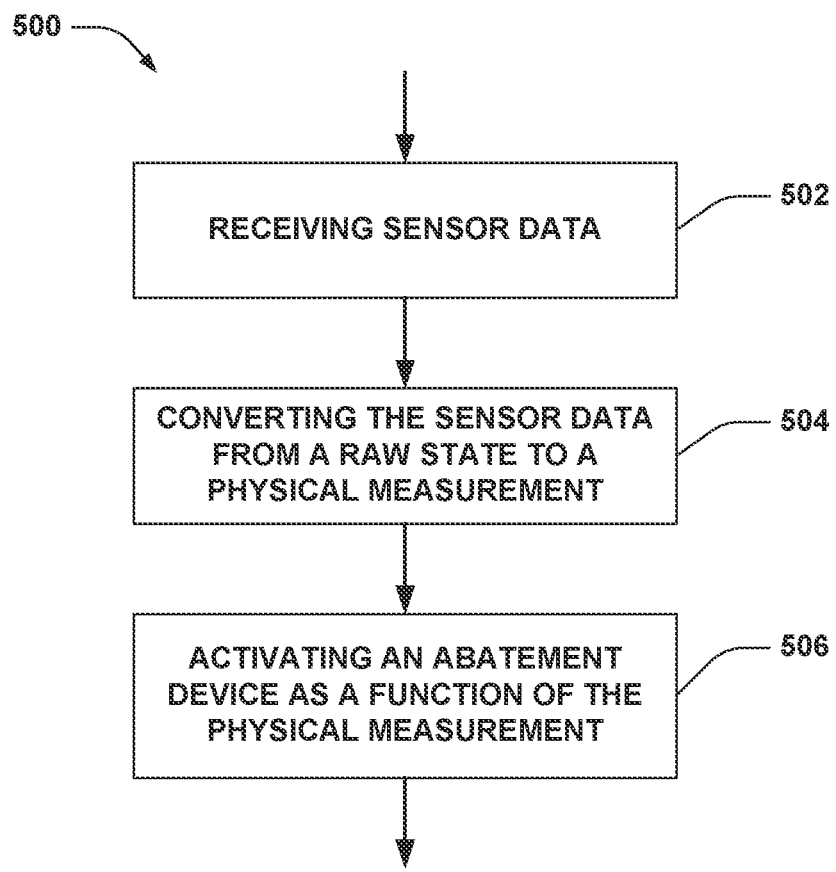
FIG. 5 illustrates a method for providing lower level physical-layer gateway functionalities and upper-level application functionalities.

FIG. 5 provides an illustrative method 500 for providing lower level physical-layer gateway functionalities and upper-level application functionalities, in accordance with an embodiment. Method 500 can commence at 502 where sensor data can be received, wirelessly and/or through wire, from one or more sensors, such as sensors associated with air quality monitor devices located in a habitable building (e.g., residential building, apartment building, hospital, office, industrial building, etc.), or part thereof (e.g., bedroom, kitchen, dining room, office, clean room, operating room, datacenter, and the like). At 504 the received data can be subjected to a conversion process, wherein the received sensor data (e.g., raw data) is converted to a physical unit of measure using a conversion equation, conversion table, or conversion graph (wherein the conversion equations, conversion tables, and/or conversion graphs are related or pertain to one or more of the sensors associated with the air quality monitor devices, such as calibration curves that relate how to convert sensor signals to units of measure, etc.). At 506 the physical units of measure can be utilized to activate an abatement device, such as an extraction fan, blower, ventilation system, and the like, in order to reduce the amount of contaminant detected by the sensors associated with the air quality monitor devices.

Figure 6:
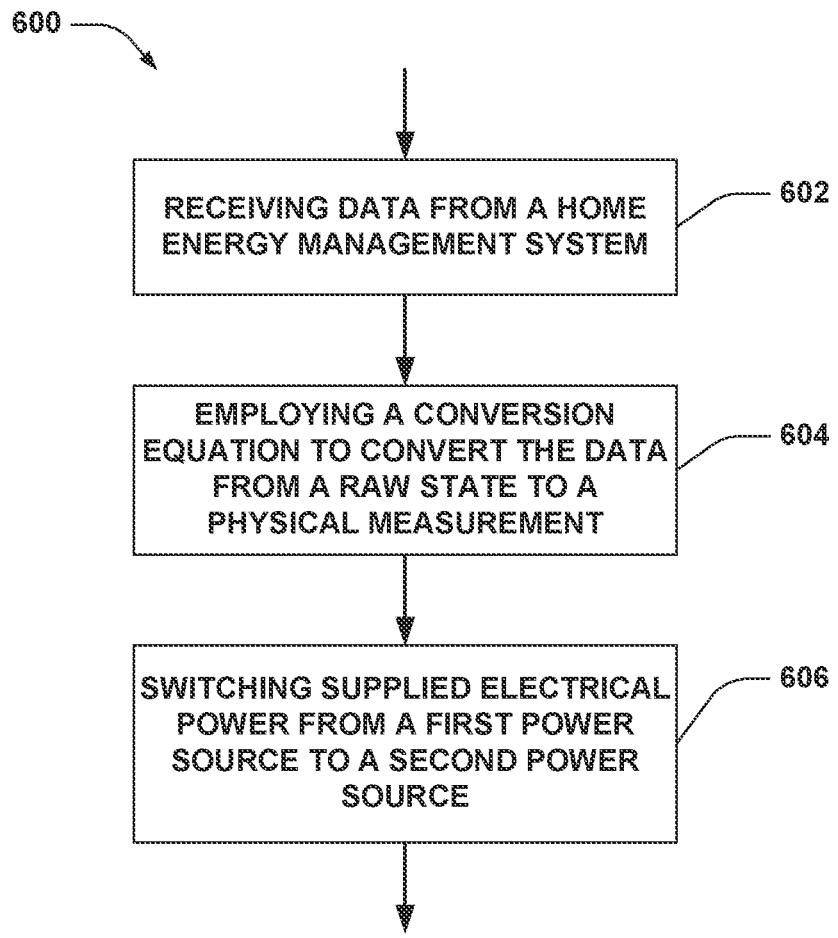
FIG. 6 illustrates a further method for providing lower level physical-layer gateway functionalities and upper-level application functionalities.

FIG. 6 provides a further illustrative method 600 for providing lower level physical-layer gateway functionalities and upper-level application functionalities, in accordance with an embodiment. Method 600 can commence at 602 where data from a home energy management system can be received. At 604 the received data can be converted from a raw state to a measurement unit using one or more conversion equation, wherein the conversion equation is a function of calibration specifications for one or more sensors included in the home energy management system. At 606 the supplied electrical power to a structure within which the home energy management system is located can be switched from a first power source (e.g., power emanating from the standard electrical grid—mains power) to an alternate power source, such as power generated, for example, by solar panel associated with the structure.

Figure 7:
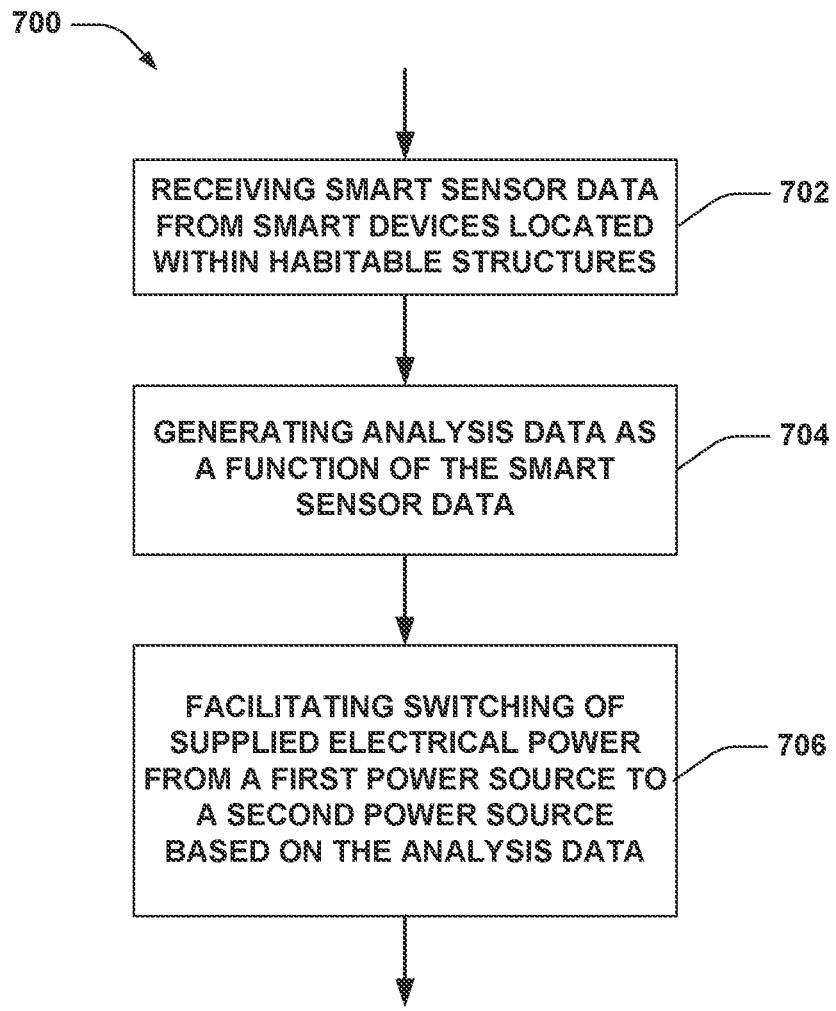
FIG. 7 illustrates an additional method for providing lower level physical-layer gateway functionalities and upper-level application functionalities.

FIG. 7 depicts a method 700 for providing lower level physical-layer gateway functionalities and upper-level application functionalities, in accordance with an embodiment. Method 700 can commence at 702 wherein smart data from one or more smart sensor device, such as smart relays, wirelessly controllable thermostats with manual override capabilities, wirelessly controllable power outlets (e.g., switches and/or dimmers) with manual override capabilities, etc. can be received. At 704 the received smart data can be utilized to generate analysis data, such as changes heat map data, changes in pressure pad or proximity sensor data, and the like. At 706 through use of smart relays, smart plugs, intelligent thermostats, etc. supplied electrical power to a habitable structure within which the home energy management system is located can be switched from a first power source (e.g., power emanating from the standard electrical grid—mains power) to an alternate power source, such as power generated, for example, by a solar panel associated with the structure.

Figure 8:
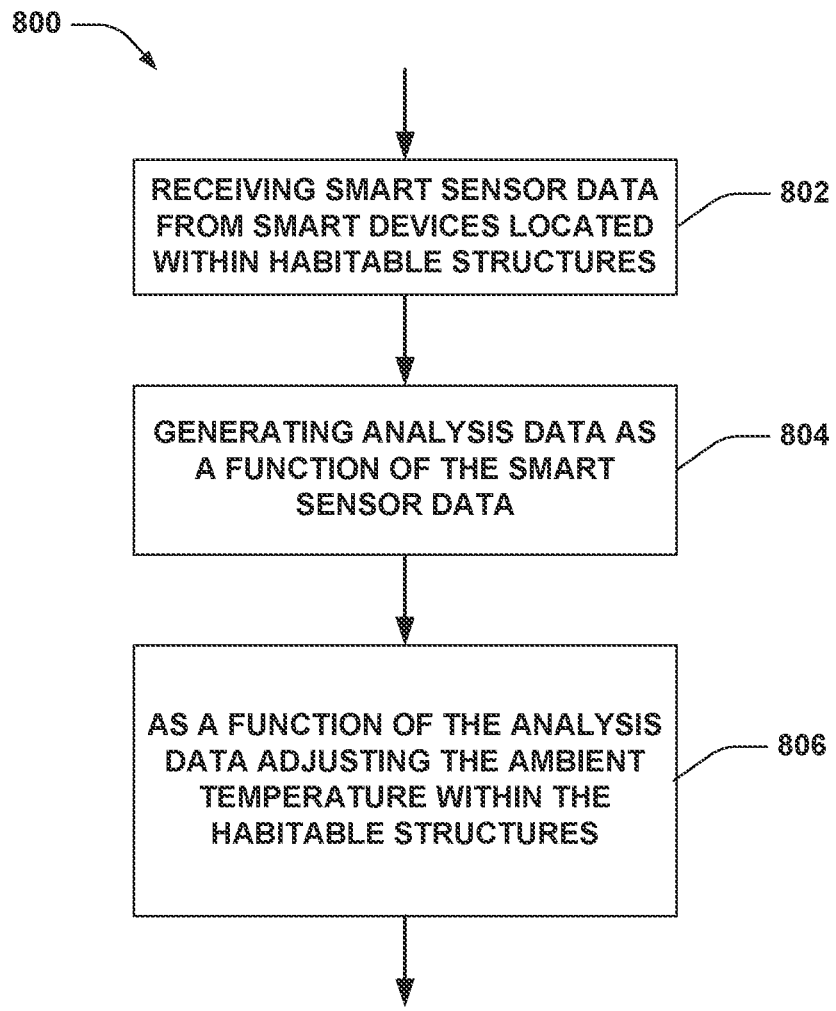
FIG. 8 illustrates a further method for providing lower level physical-layer gateway functionalities and upper-level application functionalities.

FIG. 8 depicts a method 800 for providing lower level physical-layer gateway functionalities and upper-level application functionalities, in accordance with an embodiment. Method 800 can commence at 802 wherein smart data from one or more smart sensor device, such as smart relays, wirelessly controllable thermostats with manual override capabilities, wirelessly controllable power outlets (e.g., switches and/or dimmers) with manual override capabilities, heat sensing devices, proximity sensor devices, moisture sensing devices, and the like, can be received. At 804 the received smart data can be utilized to generate analysis data, such as differential changes in heat map data, changes in pressure pad or proximity sensor data, and the like. At 806 through use of smart relays, smart plugs, intelligent thermostats, intelligent feedback devices, etc. the temperature within habitable structures or identified areas with habitable structures can be adjusted. For instance, where at 804, analysis of the analysis data indicates that a selected area of a habitable structure has no human activity within it, the temperature can be reduced, at 806, in order to reduce power consumption within the structure.

Figure 9:
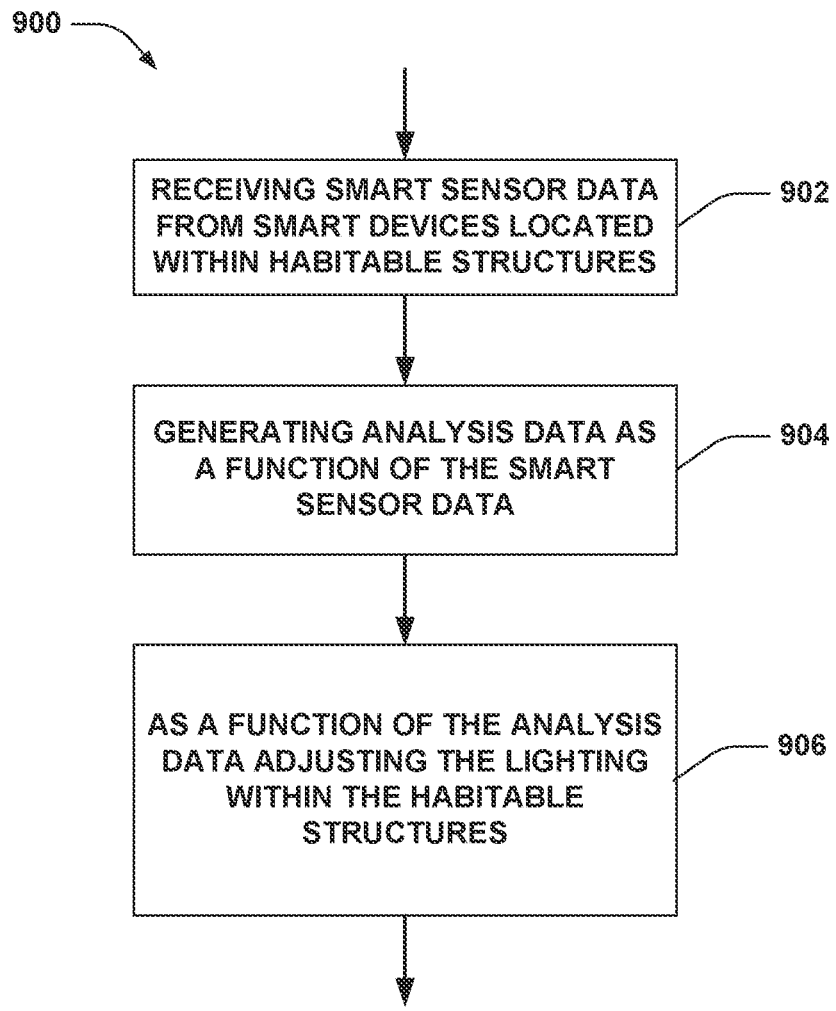
FIG. 9 illustrates another method for providing lower level physical-layer gateway functionalities and upper-level application functionalities.

FIG. 9 depicts a method 900 for providing lower level physical-layer gateway functionalities and upper-level application functionalities, in accordance with an embodiment. Method 900 can commence at 902 wherein smart data from one or more smart sensor device, such as smart relays, wirelessly controllable thermostats with manual override capabilities, wirelessly controllable power outlets (e.g., switches and/or dimmers) with manual override capabilities, heat sensing devices, proximity sensor devices, moisture sensing devices, and the like, can be received. At 904 the received smart data can be utilized to generate analysis data, such as differential changes in heat map data, changes in pressure pad or proximity sensor data, and the like. At 906 through use of smart relays, smart plugs, intelligent thermostats, intelligent feedback devices, etc. lighting within habitable structures or identified areas within habitable structures can be adjusted. For example, where at 904, analysis of the analysis data (e.g., heat mapping data) indicates that a selected area of a habitable structure has no human activity within it, the lighting within the selected area can be dimmed or turned off, at 906, in order to reduce power consumption within the habitable structure.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
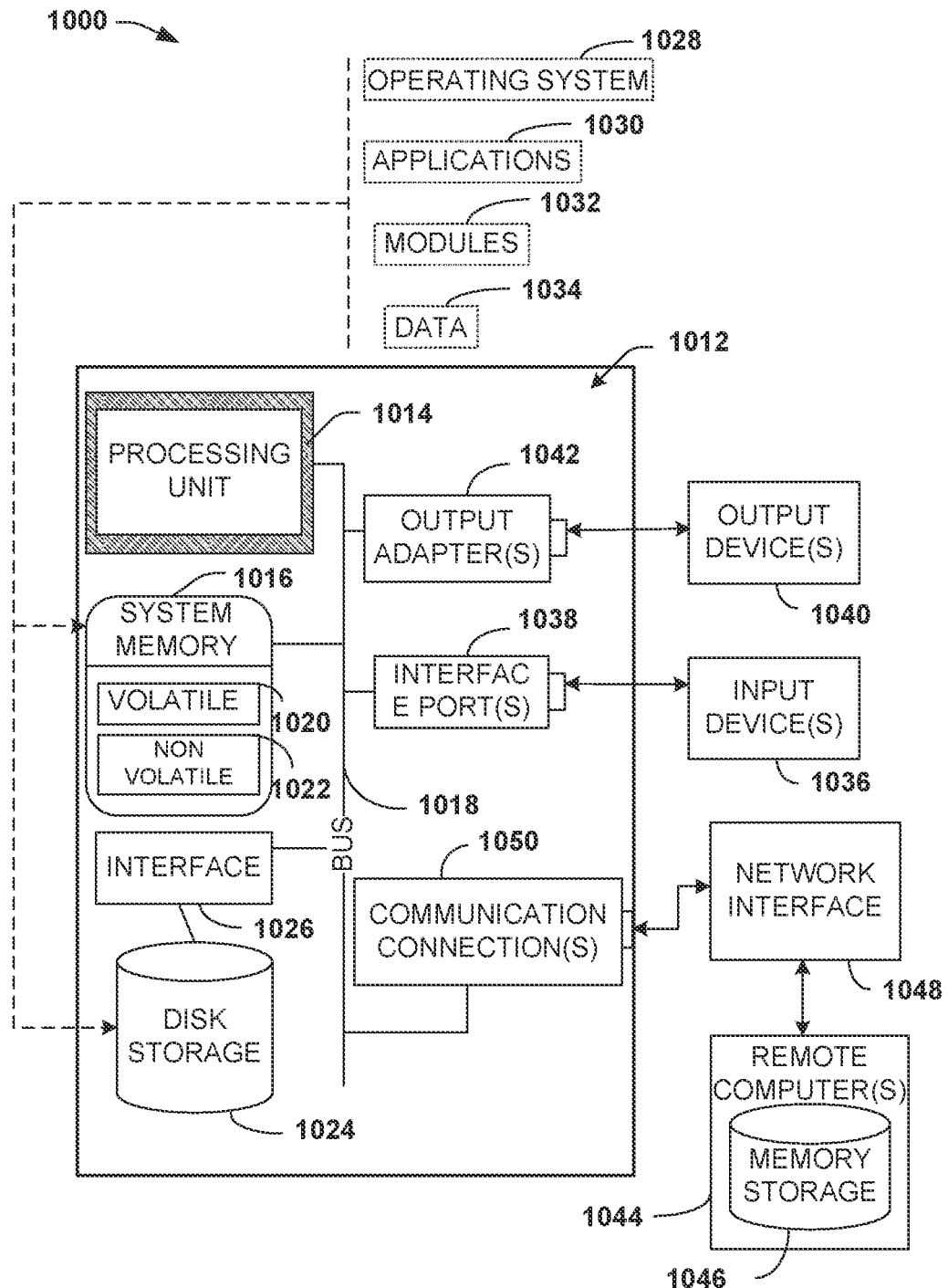
FIG. 10 illustrates a block diagram of a computing system operable to execute the disclosed systems and methods, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented, e.g., various processes associated with FIGS. 1-14. While the subject matter has been described above in the general context of computer-executable instructions of a computer program that runs on a computer and/or computers, those skilled in the art will recognize that the subject application also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, handheld computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media, networked attached storage (NAS), e.g., SAN storage, etc. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1014 through system bus 1018 via interface port(s) 1038. Interface port(s) 1038 include, for example, a serial port, a parallel port, a game port, and a universal serial bus (USB). Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and/or wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
   a processor; and
   a memory that stores executable instructions that, when executed by the processor, facilitate performance of operations, comprising:
   receiving, from a first device, a first packet representing first data formatted in a first protocol language, the first data comprising temperature data of at least one refrigeration unit;
   obtaining, from infrared equipment located in proximity to the at least one refrigeration unit, heat map data;
   detecting fluctuations in temperatures in the at least one refrigeration unit that exceed defined optimal threshold values;
   determining a differential change in the heat map data;
   in response to temperature fluctuation data and the differential change in the heat map data, converting the first data to second data formatted in a second protocol language; and
   transmitting a second packet representing the second data to a second device.

2. The device of claim 1, further comprising a customizable radio module that facilitates wireless communication between the first device and the second device.

3. The device of claim 2, wherein the customizable radio module implements a modular connectivity standard based on a connectivity protocol.

4. The device of claim 3, wherein the connectivity protocol is an implementation of a universal smart network access port technical standard.

5. The device of claim 3, wherein the connectivity protocol is an implementation of a protocol independent modular communication interface technical standard.

6. The device of claim 2, wherein the customizable radio module implements a fifth generation long term evolution wireless radio standard.

7. The device of claim 2, wherein the customizable radio module implements a fourth generation long term evolution wireless radio standard.

8. The device of claim 2, wherein the customizable radio module implements an IEEE 802.15 technical standard.

9. The device of claim 2, wherein the customizable radio module is coupled with an expansion slot located within the device.

10. The device of claim 1, wherein the operations further comprise facilitating establishing a network connection between the first device and the second device.

11. The device of claim 1, wherein the operations further comprise facilitating authentication between the first device and the second device.

12. The device of claim 1, wherein the operations further comprise detecting a power outage as a function of a fluctuation in a flow of data, between the first device and the second device, traversing through the device.

13. The device of claim 1, wherein the operations further comprise detecting a power outage as a function of a cessation of input power to the device.

14. A method, comprising:
in response to receiving, by a system with a processor, first data formatted in a first protocol language from a first device, the first data comprising temperature data of at least one refrigeration unit;
retrieving, by the system, from infrared equipment within a defined area associated with the at least one refrigeration unit, heat map data
detecting, by the system, fluctuations in temperatures in the at least one refrigeration unit that exceed defined optimal threshold values;
determining, by the system, a differential change in the heat map data;
converting, by the system, the first data to second data formatted in a second protocol language based on the fluctuations in temperatures and the differential change in the heat map data; and
sending, by the system, the second data to a second device.

15. The method of claim 14, further comprising facilitating establishing, by the system, a network connection between the first device and the second device.

16. The method of claim 14, further comprising facilitating an authentication of authentication credentials between the first device and the second device.

17. The method of claim 14, further comprising in response to determining based on a diminution of a flow of data packets between the first device and the second device, detecting a commencement of a power outage.

18. A non-transitory machine-readable storage medium, comprising executable instructions that, when executed by the processor, facilitate performance of operations, comprising:
in response to receiving, first data formatted in a first protocol language from a first device, the first data comprising temperature data of at least one refrigeration unit;
receiving, from infrared equipment situated proximate to the at least one refrigeration unit, heat map data;
detecting fluctuations in temperatures in the at least one refrigeration unit that exceed defined optimal threshold values;
based on the heat map data, determining a differential change in the heat map data;
based on the fluctuations in temperatures and the differential change in the heat map, converting, the first data to second data formatted in a second protocol language; and
sending, the second data to a second device.

19. The non-transitory machine-readable storage medium of claim 18, wherein the first communication protocol language is determined as a function of a first connectivity radio module coupled to the processor.

20. The non-transitory machine-readable storage medium of claim 18, wherein the second communication protocol language is determined as a function of a second connectivity radio module coupled to the processor.

* * * * *